W. WILBUR.
Grain Drier.
No. 13,557.
Patented Sept. 11, 1855.
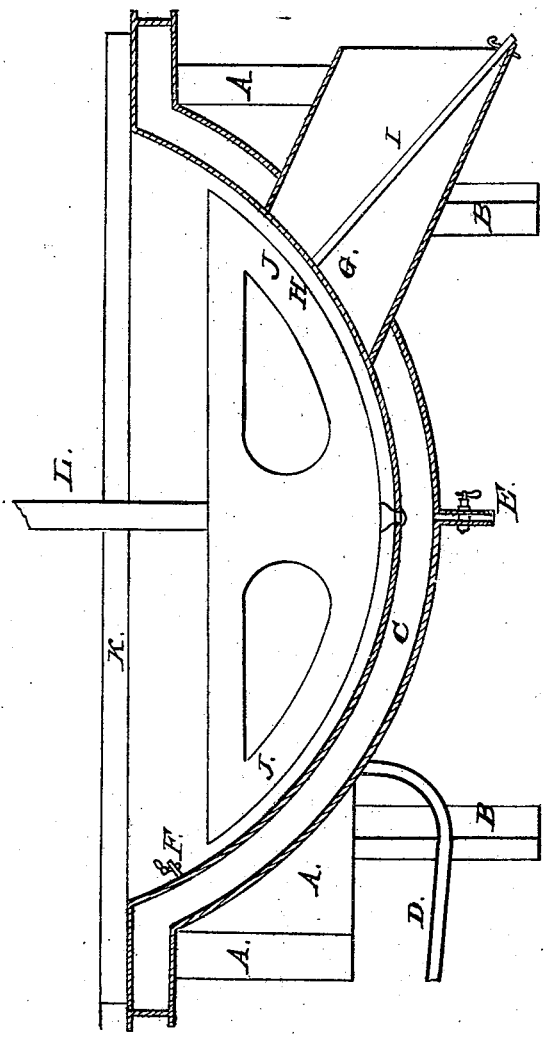

UNITED STATES PATENT OFFICE.

WILLIAM WILBER, OF NEW ORLEANS, LOUISIANA.

STEAM APPARATUS FOR EXTRACTING VEGETABLE OILS.

Specification of Letters Patent No. 13,557, dated September 11, 1855.

*To all whom it may concern:*

Be it known that I, WILLIAM WILBER, of the city of New Orleans, in the parish of Orleans and State of Louisiana, have invented certain new and useful Improvements in the Manner of Steaming, Heating, or Boiling Oleaginous Seeds Preparatory to Extracting Their Oils; and I do hereby declare the following to be a full, clear, and exact description of the same, reference being had to the accompanying drawing, making a part thereof, and which represents a vertical central section through the apparatus.

The nature of my invention consists in the construction of a caldron or kettle surrounded with a steam jacket, and furnished with an inlet cock to admit steam direct to the seed as it may be required, in addition to the steam surrounding it, and an opening for the delivery of the seed when sufficiently cooked or steamed.

To enable others skilled in the art to make and use my invention, I will proceed to describe the same with reference to the drawings.

A represents the outer frame supported on legs B. The inner part of the kettle is circular in form, and has a jacket surrounding it, so as to leave a clear space C, between the two. Or it may be called a double kettle, with a steam chamber between.

D, represents a steam pipe which may lead from a steam generator, and furnishes the steam into the clear space C, surrounding the kettle, and E, is a waste pipe, for drawing off the condensed steam.

F is a cock in the inside of the kettle, which communicates with the steam space C. Or this cock may be on a pipe leading direct from the boiler. The object being to heat and moisten the crushed seed by the direct application of steam thrown into them, while they are surrounded by steam which heats them by conduction through the metallic boiler.

A passage G is made through both shells, or the outer and inner kettles, which while the process of steaming is going on, is closed up by a stopper H, which has a rod I attached to it, extending out of said opening, so that when the seeds are sufficiently cooked, by means of said rod the stopper is withdrawn, and the stirrer J, continuing to revolve, forces all the cooked material out of said opening, whence it is conducted to the press.

K, is a tight cover fitting over the kettle, and L the shaft of the stirrer which may be rotated by a belt passing over a pulley on said shaft.

The heating and moistening of crushed seeds by direct and indirect action of steam at the same time, is believed to be entirely new, in connection with the preparatory processes of extracting oils from seeds, and I find the moistening of the seeds to produce more oil, than when only heated or cooked dry.

Having thus fully described the nature of my invention, what I claim therein as new and desire to secure by Letters Patent is—

A kettle for steaming, or boiling and moistening, crushed oleaginous seeds, into which steam is admitted, while it is surrounded by steam, so that the cooking and moistening be done by the direct and indirect action of steam, substantially as described.

WILLIAM WILBER.

Witnesses:
 A. B. STOUGHTON,
 THOMAS H. UPPERMAN.